(12) United States Patent
Choi

(10) Patent No.: US 10,823,242 B2
(45) Date of Patent: Nov. 3, 2020

(54) BRAKE APPARATUS FOR VEHICLE

(71) Applicant: HYUNDAI MOBIS Co., Ltd., Seoul (KR)

(72) Inventor: Moo Jin Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 22 days.

(21) Appl. No.: 16/249,908

(22) Filed: Jan. 17, 2019

(65) Prior Publication Data
US 2019/0219117 A1 Jul. 18, 2019

(30) Foreign Application Priority Data
Jan. 17, 2018 (KR) ........................ 10-2018-0006045

(51) Int. Cl.
| | |
|---|---|
| F16D 65/18 | (2006.01) |
| F16D 55/226 | (2006.01) |
| B60T 13/74 | (2006.01) |
| F16D 121/24 | (2012.01) |
| F16D 125/48 | (2012.01) |
| F16D 125/50 | (2012.01) |

(52) U.S. Cl.
CPC ............ *F16D 65/18* (2013.01); *B60T 13/741* (2013.01); *F16D 55/226* (2013.01); *F16D 65/183* (2013.01); *F16D 2121/24* (2013.01); *F16D 2125/48* (2013.01); *F16D 2125/50* (2013.01)

(58) Field of Classification Search
CPC ...... F16D 55/226; F16D 65/18; F16D 65/183; F16D 2121/24; F16D 2125/48; F16D 2125/50; B60T 13/741

USPC .............................................. 188/72.7, 72.8
See application file for complete search history.

(56) References Cited

U.S. PATENT DOCUMENTS

| | | | | |
|---|---|---|---|---|
| 5,161,650 | A * | 11/1992 | Taig ....................... | B60T 13/12 188/72.8 |
| 6,098,763 | A * | 8/2000 | Holding ................ | B60T 13/741 188/158 |
| 6,554,109 | B1 * | 4/2003 | Olschewski ............. | H02K 7/06 188/72.8 |
| 6,837,342 | B1 * | 1/2005 | Olschewski .......... | F16D 55/228 188/72.5 |
| 7,931,129 | B2 * | 4/2011 | Norman ................ | F16D 65/568 188/196 BA |
| 2009/0294224 | A1 * | 12/2009 | Sakashita .............. | F16D 65/183 188/72.2 |
| 2011/0100768 | A1 * | 5/2011 | Baumgartner ........ | B60T 13/741 188/72.2 |

FOREIGN PATENT DOCUMENTS

JP            2017155917             9/2017

* cited by examiner

Primary Examiner — Thomas J Williams
(74) Attorney, Agent, or Firm — H. C. Park & Associates

(57) ABSTRACT

A brake apparatus for vehicle may include: a pair of pressurization units configured to receive driving force from a drive unit and pressurize a brake pad; and a load transmitting unit installed between the pair of pressurization units and coupled to the pair of pressurization units to transmit a pressurizing load of any one of the pair of pressurization units to another one of the pair of pressurization units.

20 Claims, 6 Drawing Sheets

BRAKE APPARATUS FOR VEHICLE

CROSS-REFERENCES TO RELATED APPLICATION

This application claims priority from and the benefit of Korean Patent Application No. 10-2018-0006045, filed on Jan. 17, 2018, which is hereby incorporated by reference for all purposes as if set forth herein.

BACKGROUND

Field

Exemplary embodiments relate to a brake apparatus for vehicle, and more particularly, to a brake apparatus for vehicle capable of uniformly transmitting a load to a brake pad.

Discussion of the Background

In general, an actuator of an electronic parking brake for vehicle is configured of a motor and a power transmission device which are provided to operate a friction pad installed on a caliper of a disk brake apparatus when parking.

When a driver pushes a parking brake switch, rotating force of a motor of the actuator is transmitted to an input shaft of the caliper through the power transmission device such as a reducer. Then, a pressurizing connection sleeve is moved forward by the rotation of the input shaft, so that a caliper housing and a piston that houses the pressurizing connection sleeve are moved in directions approaching each other by the forward movement of the pressurizing connection sleeve, whereby two friction pads mounted to the piston and the caliper housing pressurize opposite surfaces of a disk to inhibit the rotation of the disk.

In the case where a plurality of pistons are supplied with driving force from the single actuator, a load may be unevenly transmitted to the plurality of pistons. In this case, one-sided wear may be caused, whereby braking performance may be reduced.

The above information disclosed in this Background section is only for enhancement of understanding of the background of the invention and, therefore, it may contain information that does not constitute prior art.

SUMMARY

Exemplary embodiments of the present invention provide a brake apparatus for vehicle capable of uniformly transmitting, using a load transmitting unit, a load to a brake pad.

Additional features of the invention will be set forth in the description which follows, and in part will be apparent from the description, or may be learned by practice of the invention.

An exemplary embodiment of the present invention discloses a brake apparatus for vehicle that may include: a pair of pressurization units configured to receive driving force from a drive unit and pressurize a brake pad; and a load transmitting unit installed between the pair of pressurization units and coupled to the pair of pressurization units, the load transmitting unit being configured to transmit a pressurizing load of any one of the pair of pressurization units to the other pressurization unit.

Each of the pair of pressurization units may include: a sun gear configured to be rotated by the driving force transmitted from the drive unit; a planetary gear configured to rotate while engaging with the sun gear; a carrier unit coupled to the planetary gear; and a piston unit coupled with the carrier unit and configured to receive rotating force from the planetary gear and pressurize the brake pad.

The load transmitting unit may include a pair of ring gears, each of the pair of ring gears is configured to rotate while engaging with the one or more planetary gears, and the pair of ring gears are configured to be directly or indirectly engaged with each other.

The load transmitting unit may further include one or more transmission gear units disposed between the pair of ring gears and configured to be engaged with the ring gears.

The transmission gear units may include at least one of a spur gear unit, a bevel gear unit, and helical gear unit.

The ring gear may include: a ring gear inner-part including internal gear teeth formed along an inner circumferential surface of the ring gear inner-part, the internal gear teeth engaging with the planetary gear; and a ring gear outer-part coupled with an outer surface of the ring gear inner-part and including external gear teeth formed along an outer circumferential surface of the ring gear outer-part, the external gear teeth engaging with the one or more transmission gear units.

The ring gear inner-part and the ring gear outer-part may be formed integrally with each other.

The ring gear inner-part may protrude toward the sun gear further than the ring gear outer-part, and the ring gear inner-part may be inserted into the sun gear.

The carrier unit may be splined to the piston unit.

The piston unit may receive the rotating force from the carrier unit and linearly reciprocate in a direction toward the brake pad.

The sun gear may include: a sun gear carrier including first gear teeth formed along an outer circumferential surface of the sun gear carrier, the first gear teeth engaging with the drive unit; and a sun gear body including second gear teeth formed along an outer circumferential surface of the sun gear body such that the second gear teeth engage with the planetary gear, the sun gear body being coupled to the sun gear carrier and configured to be concentric with a rotating center of the sun gear carrier.

The sun gear carrier and the sun gear body may be formed integrally with each other.

The drive unit may include: a driving main body; and a driving force transmitting gear unit being configured to transmit driving force from the driving main body to the sun gear.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
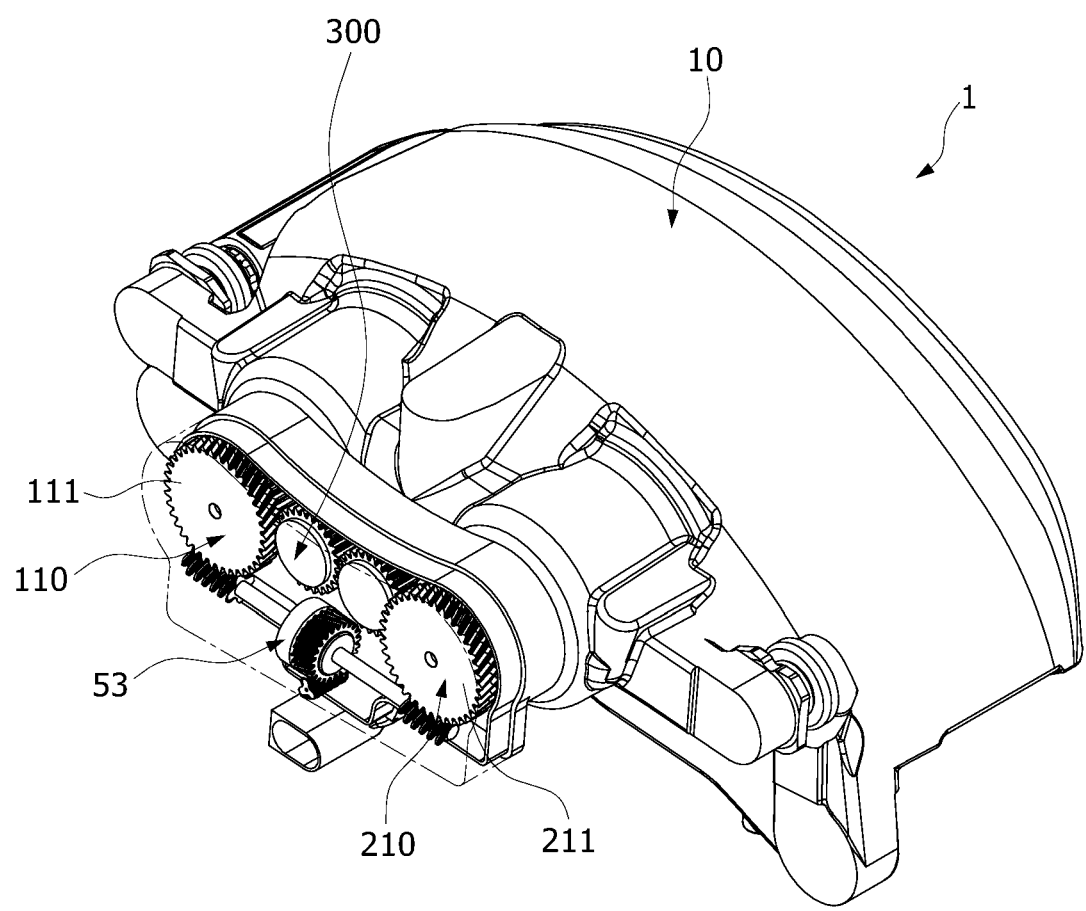
FIG. 1 is a perspective view illustrating a brake apparatus for vehicle in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
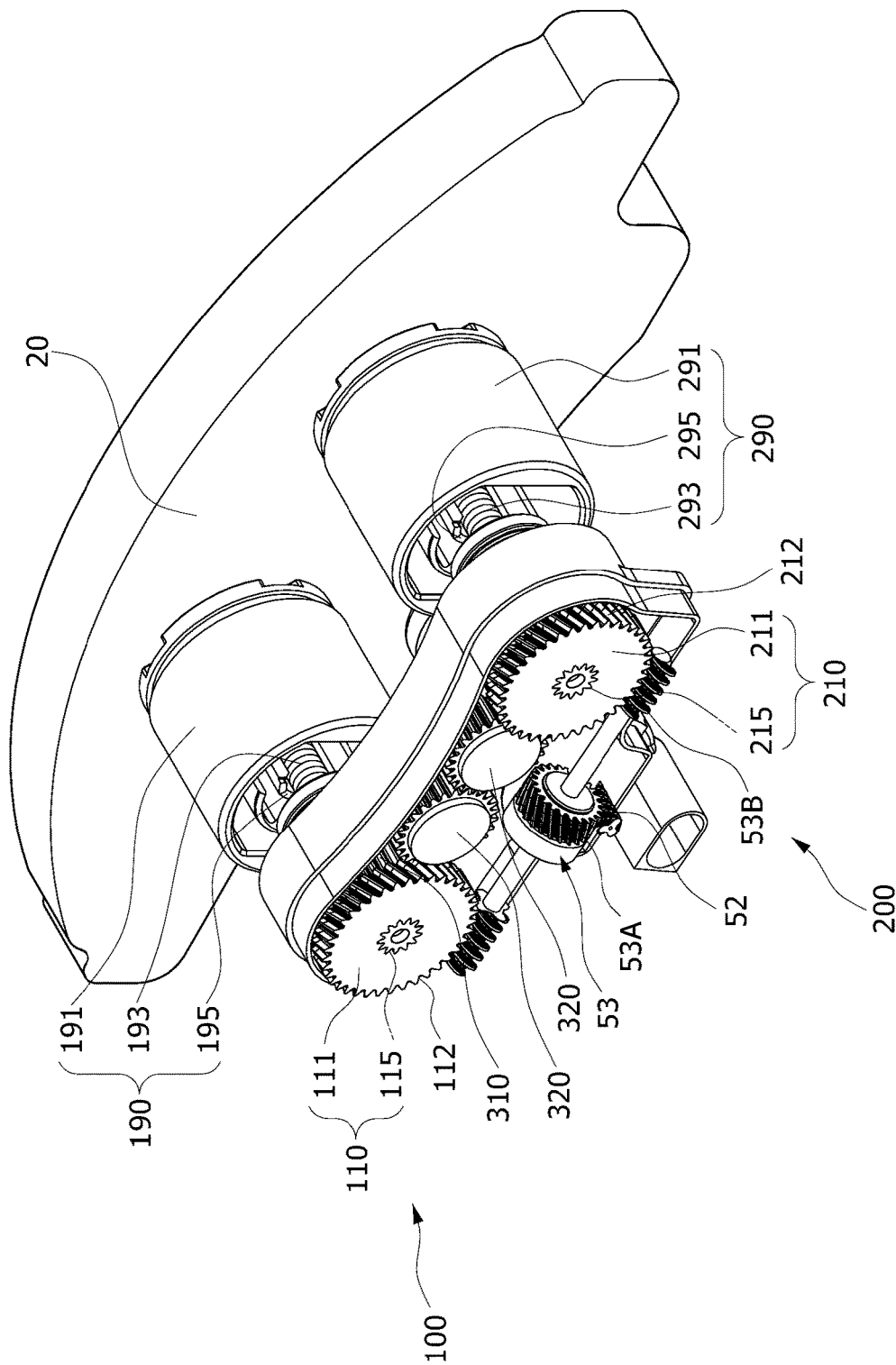
FIG. 2 is a partial perspective view illustrating the brake apparatus in accordance with the embodiment of the present invention.
Figure 3:
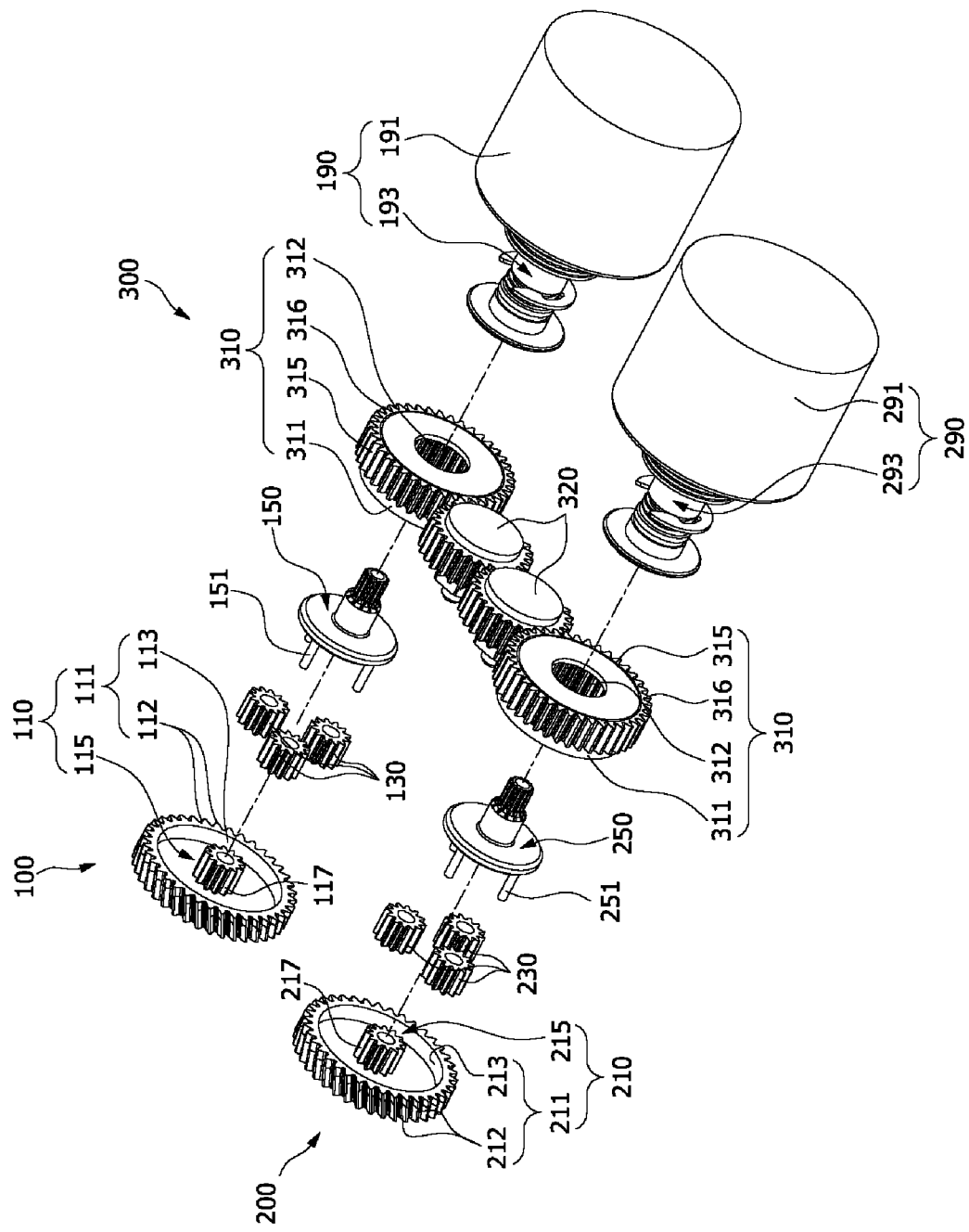
FIG. 3 is an exploded perspective view illustrating the brake apparatus in accordance with the embodiment of the present invention.
Figure 4:
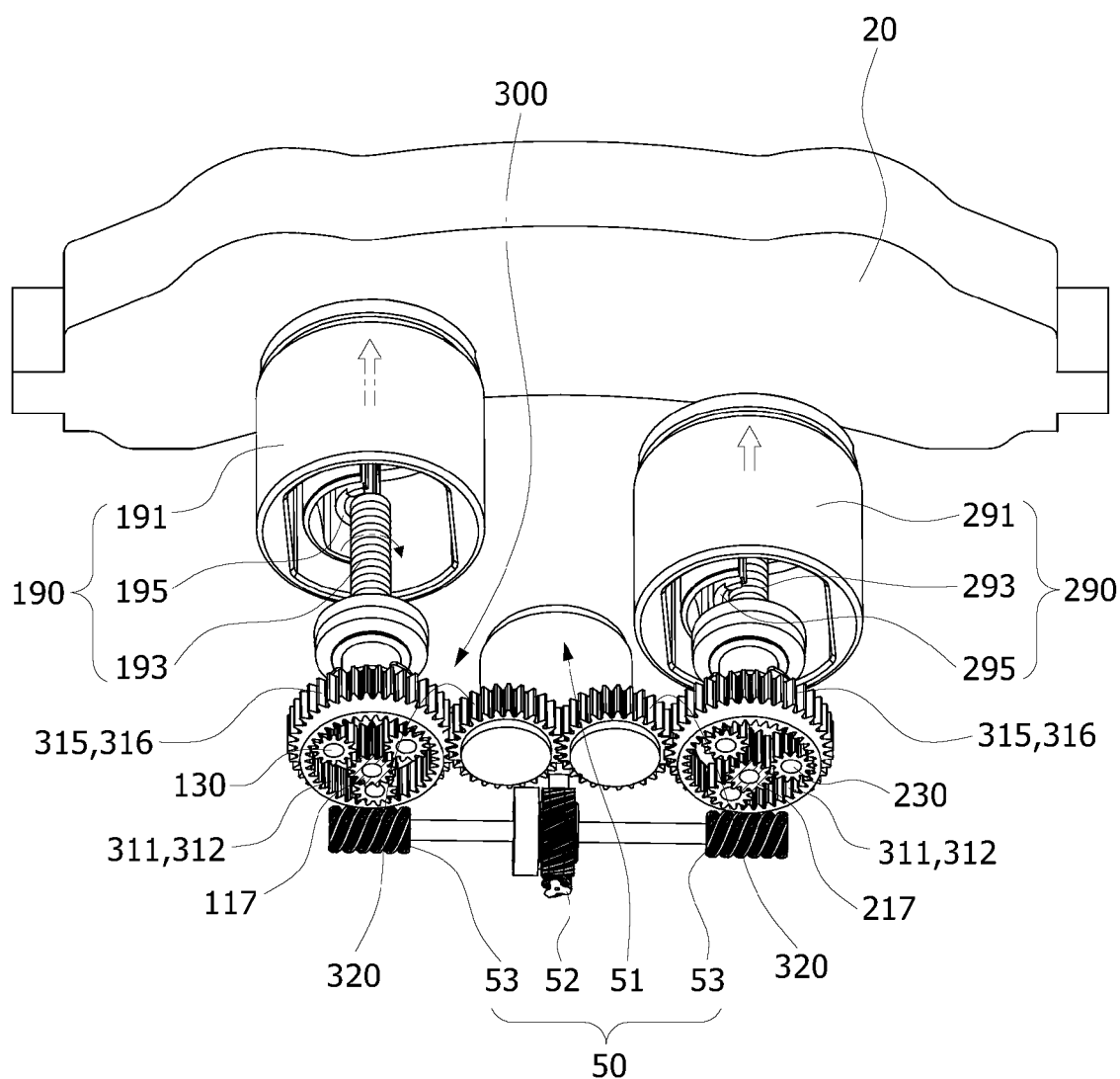
FIGS. 4 to 6 are views illustrating a driving state of the brake apparatus in accordance with the embodiment of the present invention.
Figure 5:
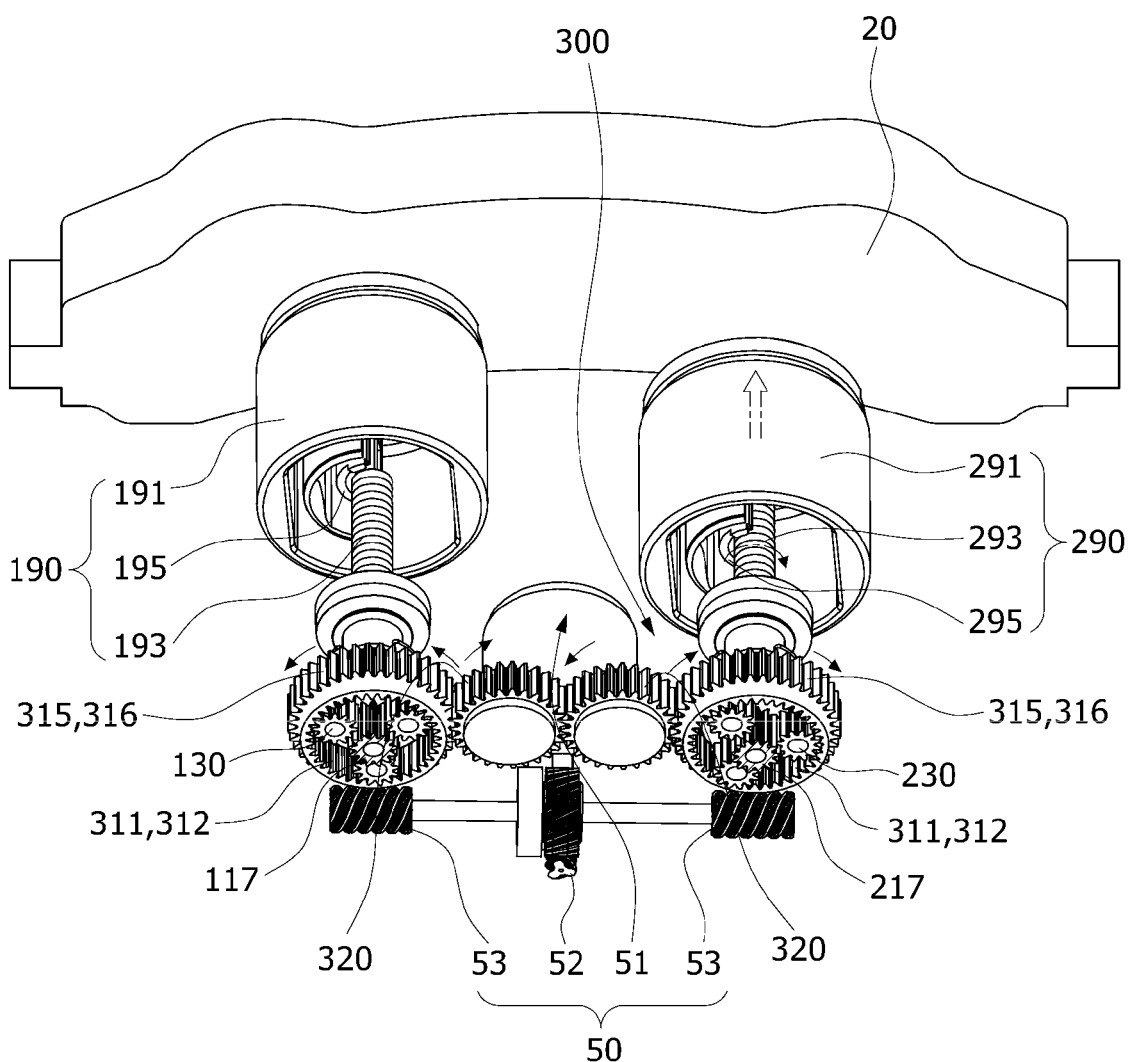
Figure 6:
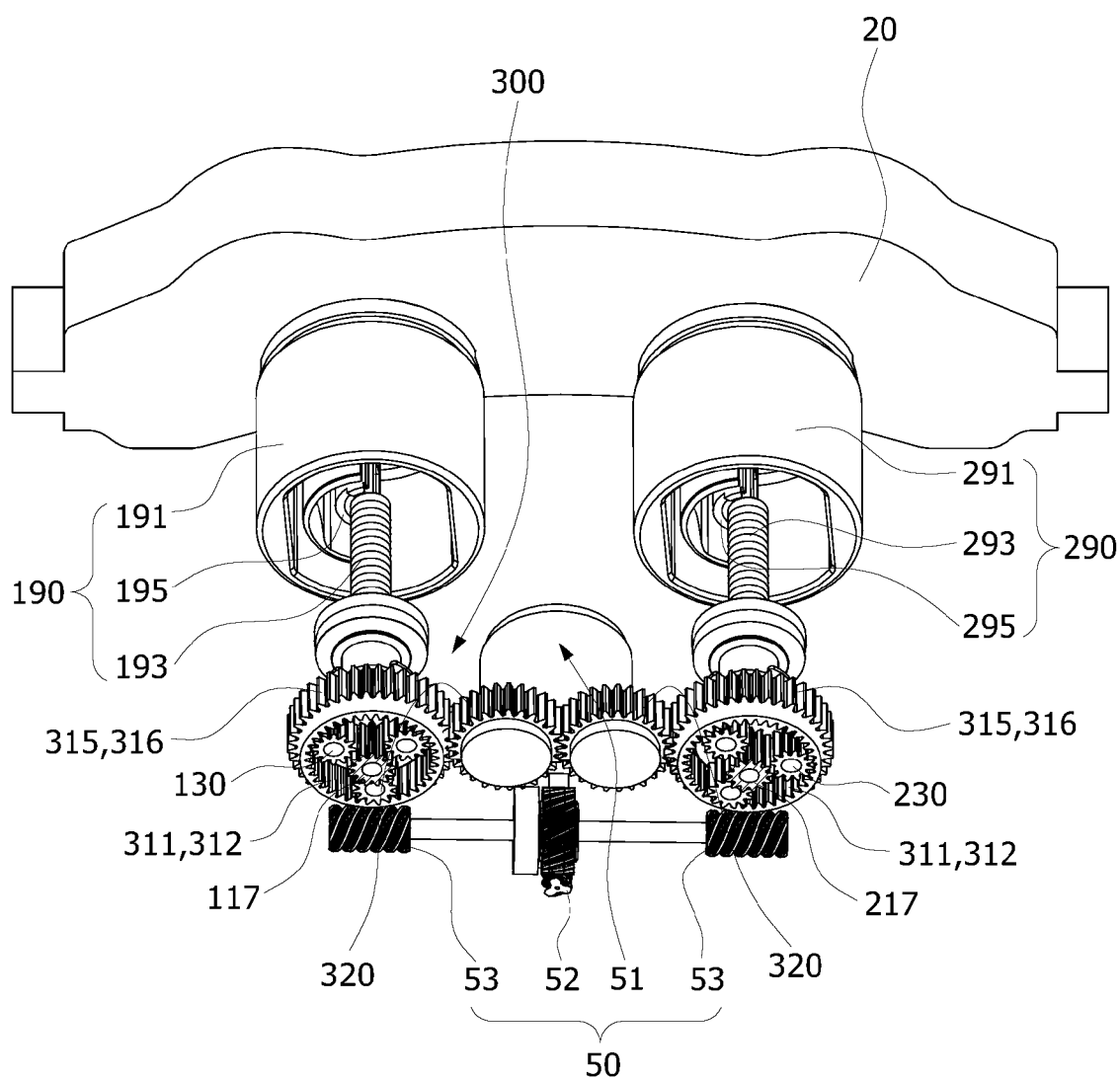

FIG. 1 is a perspective view illustrating a brake apparatus for vehicle in accordance with an embodiment of the present invention. FIG. 2 is a partial perspective view illustrating the brake apparatus in accordance with the embodiment of the present invention. FIG. 3 is an exploded perspective view illustrating the brake apparatus in accordance with the embodiment of the present invention. FIGS. 4 to 6 are views illustrating a driving state of the brake apparatus in accordance with the embodiment of the present invention.

Referring to FIGS. 1 to 4, the brake apparatus 1 for vehicle in accordance with the embodiment includes a pressurization unit 100 and 200, and a load transmitting unit 300.

The pressurization unit 100 and 200 in accordance with the embodiment of the present invention is configured to receive driving force from a drive unit 50 and pressurize a brake pad 20 that is installed in a caliper housing 10 and configured to generate contact friction with a disk (not shown).

A plurality of pressurization units 100 and 200 are provided. The plurality of pressurization units 100 and 200 are disposed parallel to each other. The pressurization units 100 and 200 are symmetrically installed on left and right sides (based on FIG. 4) based on a central portion of the brake pad 20.

Thereby, the pressurization units 100 and 200 may receive driving force from the drive unit 50 and pressurize the brake pad 20 with the same pressurizing load so that the brake pad 20 is moved to the disk, and braking force is generated by friction between the brake pad 20 and the disk.

Referring to FIGS. 2 to 6, each of the pressurization units 100 and 200 in accordance with the embodiment of the present invention includes a sun gear 110, 210, a planetary gear 130, 230, a carrier unit 150, 250, and a piston unit 190, 290. In FIGS. 4 to 6, the sun gear carriers 111, 211 are omitted for convenience of explanation.

The sun gears 110 and 210 may rotate using driving force transmitted form the drive unit 50. The drive unit 50 includes a driving main body 51, and a driving force transmitting gear unit 53 which engages with the driving main body 51 and the sun gears 110 and 210 and transmits driving force from the driving main body 51 to the sun gears 110 and 210.

In detail, the driving main body 51 has a driving worm shaft 52. The driving force transmitting gear unit 53 includes a transmitting worm wheel 53A and a transmitting worm shaft 53B. The transmitting worm wheel 53A engages with the driving worm shaft 52 at one side and the transmitting worm shaft 53B engages with the sun gear carriers 111, 211 of the sun gear 110, 210 at the other side.

Each of the sun gears 110 and 210 includes a sun gear carrier 111, 211, and a sun gear body 115, 215.

Each of the sun gear carriers 111 and 211 includes first gear teeth 112, 212 formed along an outer circumferential surface thereof to engage with the drive unit 50, in detail, the driving force transmitting gear unit 53. Thereby, the driving force generated from the driving main body 51 is transmitted to the first gear teeth 112 and 212 through the driving force transmitting gear unit 53. The first gear teeth 112 and 212 are formed in a worm wheel shape.

Each of the sun gear carriers 111 and 211 in accordance with the embodiment of the present invention includes an insert depression 113, 213, into which a ring gear 310 to be described later herein, in detail, a predetermined portion of the ring gear inner-part 311, is inserted. The insert depression 113, 213 has a recessed shape.

Each of the sun gear bodies 115 and 215 in accordance with the embodiment of the present invention includes second gear teeth 117, 217 formed along an outer circumferential surface thereof to engage with the planetary gear 130, 230, and is coupled to the corresponding sun gear carrier 111, 211 and configured to be concentric with the rotating center of the sun gear carrier 111, 211.

Each of the sun gear bodies 115 and 215 is disposed inside an inner circumferential surface of the corresponding sun gear carrier 111, 211 in which the insert depression 113, 213 is formed. Each of the sun gear bodies 115 and 215 is coupled to the corresponding sun gear carrier 111, 211 and configured to be concentric with the rotating center of the sun gear carrier 111, 211.

Each of the sun gear bodies 115 and 215 is integrated with the corresponding sun gear carrier 111, 211 and interlocked with rotation of the sun gear carrier 111, 211 which is driven by driving force transmitted through the drive unit 50, in detail, the driving force transmitting gear unit 53 so that the sun gear bodies 115 and 215 rotate along with the respective sun gear carriers 111 and 211.

Each of the sun gear bodies 115 and 215 is disposed inside the plurality of corresponding planetary gears 130, 230, and the planetary gears 130, 230 engage with the second gear teeth 117, 217 formed along the outer circumferential surface of the sun gear body 115, 215 so that the planetary gears 130, 230 rotate on their own axes and revolve around the sun gear body 115, 215.

The planetary gears 130 and 230 in accordance with the embodiment of the present invention rotate by engaging with the respective sun gears 110 and 210, in detail, engage with the respective sun gear bodies 115 and 215, thus rotating on their own axes and revolve around the respective sun gear bodies 115 and 215.

In the embodiment of the present invention, the plurality of planetary gears 130, 230 are provided and disposed around the rotating center of the corresponding sun gear 110, 210 at positions spaced apart from each other at regular angular intervals.

The planetary gears 130 and 230 are coupled to the corresponding carrier unit 150 and 250, which will be described later herein. When the plurality of planetary gears 130 and 230 revolute around the corresponding sun gear bodies 115 and 215, the carrier units 150 and 250 also rotate in a clockwise direction or a counterclockwise direction (based on FIG. 4).

As the carrier units 150 and 250 rotate, the piston units 190 and 290, which will be described later herein, move toward the brake pad 20 and pressurize the brake pad 20.

Referring to FIG. 3, rotating shafts 151, 251 protrude from each carrier unit 150, 250 toward the corresponding planetary gears 130, 230. In the present embodiment, a plurality of rotating shafts 151, 251 corresponding to the number of planetary gears 130, 230 are provided, and each rotating shaft 151, 251 is coupled passing through the corresponding planetary gear 130, 230.

Thereby, each planetary gear 130, 230 can rotate on its own axis in such a way that it rotates on the corresponding rotating shaft 151, 251.

Referring to FIGS. 3 and 4, each of the piston units 190 and 290 in accordance with the embodiment of the present invention is coupled with the corresponding carrier unit 150, 250, and includes a piston body 191, 291, a screw unit 193, 293, and a nut unit 195, 295.

When the planetary gears 130 and 230 revolute along the second gear teeth 117 and 217 formed on the outer circumferential surfaces of the respective sun gears 110 and 210, in detail, the respective sun gear bodies 115 and 215, each of the carrier units 150 and 160 rotates in a clockwise direction or a counter clockwise direction (based on FIG. 4).

As the carrier units 150 and 250 rotate, the piston units 190 and 290 coupled with the respective carrier units 150 and 250 rotate along with the carrier units 150 and 250.

Each of the piston bodies 191 and 291 in accordance with the embodiment of the present invention has a hollow structure and is disposed outside the brake pad 20 to make it possible to come into contact with the brake pad 20. For example, each of the piston bodies 191 and 291 may have a cylindrical shape.

The nut unit 195 and 295 in accordance with the embodiment of the present invention are respectively coupled to the piston bodies 191 and 291, in detail, inner surfaces of the piston bodies 191 and 291.

An internal thread (not shown) is formed on an inner surface of each of the nut units 195 and 295 so as to correspond to an external thread formed on an outer circumferential surface of the corresponding bolt 193, 293, which will be described later herein, whereby the nut units 195 and 295 are respectively coupled with the screw units 193 and 293 in a threaded-coupling manner.

The screw units 193 and 293 in accordance with the embodiment of the present invention are respectively threadedly coupled with the nut units 195 and 295, and are respectively splined to the carrier units 150 and 250. In the present embodiment, although the carrier units 150 and 250 are respectively splined to the screw units 193 and 293, the present invention is not limited thereto. For example, various modifications, e.g., a structure using threaded coupling, are possible.

Thus, when the carrier units 150 and 250 rotate, the screw units 193 and 293 splined to the carrier units 150 and 250 are rotated, whereby the rotating motion of the carrier units 150 and 250 is converted into linear motion of the piston units 190 and 290.

As the piston units 190 and 290 linearly move and come into contact with the brake pad 20 to pressurize the brake pad 20, braking force can be generated by friction between the brake pad 20 and the disk.

Referring to FIGS. 2, 3, and 4, the load transmitting unit 300 in accordance with the embodiment of the present invention is installed between the pair of pressurization units 100 and 200 and coupled to both the pressurization units 100 and 200 so as to transmit a pressurizing load of any one of the pressurization units 100 and 200 to the other one of the pressurization units 100 and 200.

The load transmitting unit 300 in accordance with the embodiment of the present invention includes a pair of ring gears 310. The load transmitting unit 300 may also include one or more transmission gear units 320.

Each of the pair of ring gears 310 configured to rotate while engaging with the planetary gears 130 and 230.

The pair of ring gears 310 are directly engaged with each other.

The pair of ring gears 310 also are indirectly engaged with each other. That is, the transmission gear units 320 are disposed between the pair of ring gears 310 and engaged with the ring gears 310.

Referring to FIGS. 4 and 6, the ring gears 310 in accordance with the embodiment of the present invention are installed between the planetary gears 130 and 230. Each of the ring gears 310 includes the ring gear inner-part 311 and a ring gear outer-part 315.

Each of the ring gear inner-parts 311 in accordance with the embodiment of the present invention is disposed outside the corresponding planetary gears 130 and 230, and has on an inner circumferential surface thereof internal gear teeth 312 which engage with the corresponding planetary gears 130 and 230.

The internal gear teeth 312 of the ring gear inner-part 311 that is installed at one side (at the left side based on FIG. 4) engages with the planetary gears 130, rotates in a clockwise direction or a counter clockwise direction (based on FIG. 4), and transmits driving force to the ring gear 310, in detail, the ring gear outer-part 315 that is disposed at the other side, through the transmission gear units 320.

Each of the ring gear outer-parts 315 in accordance with the embodiment of the present invention is coupled to an outer surface of the corresponding ring gear inner-part 311, and has on an outer circumferential surface thereof an external gear teeth 316 which engage with the transmission gear units 320. The ring gear outer-parts 315 are integrally formed with the ring gear inner-parts 311.

Referring to FIGS. 4 to 6, as the internal gear teeth 312 of the ring gear inner-part 311 that is installed at one side (at the left side based on FIG. 4) engages with the planetary gears 130 and rotates in a direction, the ring gear outer-part 315 that is integrated with the ring gear inner-part 311 also rotates in the same direction, and transmits driving force to the ring gear 310, in detail, the ring gear outer-part 315 that is disposed at the other side (at the right side based on FIG. 4), through the transmission gear units 320.

Referring to FIGS. 4 to 6, the one or more transmission gear units 320 in accordance with the embodiment of the present invention rotates by engaging with the ring gears 310, in detail, the external gear teeth 316 formed on the ring gear outer-parts 315, and transmit rotating force of one of the ring gears 310 that is disposed at one side to the other one of the ring gears 310 that is disposed at the other side.

For example, the rotating force transmitted to the ring gears 310 is transmitted to the ring gear inner-part 311, the planetary gear 230, and the carrier unit 250 coupled to the planetary gear 230. Here, the planetary gear 230 revolves along the outer circumferential surface of the corresponding sun gear body 215 while the planetary gear 230 rotates on its own axis. Thereby, the carrier unit 250 coupled with the planetary gear 230 is rotated so that the piston unit 290 is moved to the brake pad 20.

Likewise, the rotating force transmitted to the ring gear 310 is transmitted to the ring gear inner-part 311, the planetary gear 130, and the carrier unit 150 coupled to the planetary gear 130. Here, the planetary gear 130 revolves along the outer circumferential surface of the corresponding sun gear body 115 while the planetary gear 130 rotates on its own axis. Thereby, the carrier unit 150 coupled with the planetary gear 130 is rotated so that the piston unit 190 is moved to the brake pad 20.

Due to the load transmitting unit 300, even when the load for pressurizing the brake pad 20 is not evenly applied to the pair of pressurization units 100 and 200, in detail, the pair of piston units 190 and 290, the pressurizing load of the piston unit 190 disposed at one side can be transmitted to the other piston unit 290, whereby the pair of piston units 190 and 290 can come into contact with the brake pad 20 with the uniform pressurizing load.

Referring to FIGS. 4 to 6, in the present embodiment, the one or more transmission gear units 320 has a spur gear shape and rotates by engaging with the external gear teeth 316 formed on the outer circumferential surfaces of the ring gear outer-parts 315.

However, the present invention is not limited to this, and various modifications are possible. For example, the one or more transmission gear units 320 may have a bevel gear shape, a helical gear shape in which gear teeth are inclined at a predetermined angle with respect to the rotating axis of the one or more transmission gear units 320, and so forth.

In the present embodiment, although the one or more transmission gear units 320 has a gear shape, the present invention is not limited thereto, and various modifications are possible. For example, the one or more transmission gear units 320 may be formed of a belt coupled to the pair of ring gears 310, so that the driving force of one of the pressurization units 100 and 200 can be transmitted to the other one of the pressurization units 100 and 200.

In the present embodiment, a plurality of load transmitting units 300 may be provided, in detail, two load transmitting units 300 are provided. However, the present invention is not limited to this, and various modifications are possible. For example, one load transmitting unit 300 or three or more load transmitting units 300 may be provided depending on the distance between the pair of pressurization units 100 and 200.

Hereinbelow, the operating principle and effect of the brake apparatus 1 for vehicle having the above-mentioned configuration will be described.

Referring to FIGS. 1 to 6, the brake apparatus 1 for vehicle in accordance with the embodiment includes the pressurization units 100 and 200, and the load transmitting unit 300.

In the brake apparatus 1 for vehicle in accordance with the present invention, the plurality of pressurization units 100 and 200 pressurize the brake pad 20 so that the brake pads 20 are moved to the disk, whereby braking force is generated by contact friction between the brake pad 20 and the disk.

In the present embodiment, the two pressurization units 100 and 200 are provided, but the present invention is not limited thereto, and various modifications are possible. For example, three or more pressurization units may be provided.

The pressurization units 100 and 200 receive driving force from the drive unit 50 and linearly reciprocate toward or away from the brake pad 20.

In detail, if driving force is generated from the driving main body 51 using power transmitted from an external device, the driving force transmitting gear unit 53 coupled with the driving main body 51 is rotated by the driving force transmitted from the driving main body 51. The rotating force of the driving force transmitting gear unit 53 is simultaneously transmitted to the pair of pressurization units 100 and 200.

As the driving force transmitting gear unit 53 rotates, the first gear teeth 112 and 212 that are respectively formed on the outer circumferential surfaces of the sun gears 110 and 210, in detail, on the outer circumferential surfaces of the sun gear carriers 111 and 211, are rotated engaging with the transmitting worm shaft 53B of the driving force transmitting gear unit 53.

When the sun gear carriers 111 and 211 rotate, the sun gear bodies 115 and 215 that are respectively coupled to the sun gear carriers 111 and 211 are also rotated. In addition, the planetary gears 130 and 230 that respectively engage with the second gear teeth 117 and 217 formed on the outer circumferential surfaces of the sun gear bodies 115 and 215 respectively revolute around the circumferences of the sun gear bodies 115 and 215 while each of the planetary gears 130 and 230 rotates on its own axis.

While the planetary gears 130 and 230 make revolutions, the carrier units 150 and 250 coupled to the planetary gears 130 and 230 rotate in a clockwise direction or a counter clockwise direction. As the carrier units 150 and 250 rotate, the piston units 190 and 290 coupled with the respective carrier units 150 and 250 move to the brake pad 20 and come into contact with the brake pad 20 to pressurize the brake pad 20.

Since the driving force transmitting gear unit 53 is coupled to the pair of pressurization units 100 and 200, the pair of pressurization units 100 and 200 simultaneously receive the driving force from the drive unit 50.

Referring to FIG. 5, during the operation of the brake apparatus 1 for vehicle, if the amount of driving force transmitted to one of the pair of pressurization units 100 and 200 that is disposed at one side (at the left side based on FIG. 5) is greater than that of the other one of the pressurization units 100 and 200 that is disposed at the other side (at the right side based on FIG. 5), the piston unit 190 may be in contact with the brake pad 20, and each of the planetary gears 130 of the left pressurization unit 100 (based on FIG. 5) may make only rotation on its own axis.

Since the driving force is continuously transmitted from the drive unit 50 to the sun gear 110, the sun gear 110 is rotated, and each of the planetary gears 130 that engage with the sun gear 110, in detail, with the sun gear body 115, makes only rotation on its own axis.

The pressurization unit 100 (disposed at the left side based on FIG. 5), in detail, the piston unit 190, can no longer move toward the brake pad 20. Therefore, due to reaction force with respect to this, each of the planetary gears 130 makes only rotation on its own axis, and the ring gear inner-part 311 provided with the internal gear teeth 312 engaging with the planetary gears 130 is rotated in a clockwise direction or a counter clockwise direction.

The reaction force generated from the pressurization unit 100 disposed at the one side (at the left side based on FIG. 5) is transmitted to the other side (the right side base don FIG. 5) through the ring gear outer-part 315 integrally coupled with the ring gear inner-part 311, via the load transmitting unit 300. The reaction force is transmitted to the piston unit 290 of the other side through the external gear teeth 316, the internal gear teeth 312 of the ring gear inner-part 311, the planetary gears 230, and the carrier unit 250 coupled with the planetary gears 230.

Referring to FIGS. 4 to 6, due to the load transmitting unit 300 in accordance with the embodiment of the present invention, even if a pressurizing load is biased to the pressurization unit 100 of the pair of pressurization units 100 and 200 that is disposed at one side, the pressurizing load may be transmitted to the other pressurization unit 200, whereby the pair of pressurization units 100 and 200 may pressurize the brake pad 20 toward the disk with uniform pressurizing loads. Likewise, even if a pressurizing load is biased to the pressurization unit 200 of the pair of pressurization units 100 and 200, the pressurizing load may be transmitted to the other pressurization unit 100, whereby the pair of pressurization units 100 and 200 may pressurize the brake pad 20 toward the disk with uniform pressurizing loads.

Referring to FIG. 3, the ring gear inner-parts 311 in accordance with the embodiment of the present invention protrude toward the corresponding sun gears 110 and 210 (toward the left side based on FIG. 3) further than do the ring gear outer-parts 315. A predetermined portion of each of the ring gear inner-parts 311 is inserted into the corresponding sun gear 110, 210, in detail, into the corresponding insert depression 113, 213.

Therefore, when receiving rotating force from the drive unit 50, the ring gears 310 may be prevented from being removed from the respective sun gears 110 and 210 because the ring gears 310 are partially inserted into the respective sun gears 110 and 210, in detail, into the respective insert depressions 113 and 213 formed in the sun gears 110 and 210.

Referring to FIG. 3, since the carrier units 150 and 250 in accordance with the embodiment of the present invention are respectively splined to the piston units 190 and 290, the rotating force of the carrier units 150 and 250 may be transmitted to the corresponding piston units 190 and 290, in detail, the corresponding screw units 193 and 293.

The screw units 193 and 293 are respectively threadedly coupled with the nut units 195 and 295 coupled to the inner surfaces of the respective piston bodies 191 and 291 so that the piston units 190 and 290 may be moved toward the brake pad 20 by the rotating force transmitted through the carrier units 150 and 250.

In accordance with an embodiment of the present invention, due to a load transmitting unit, even if a pressurizing load is biased to any one of a plurality of pressurization units, the pressurizing load may be transmitted to the other pressurization unit, whereby the pressurization units may pressurize a brake pad with uniform pressurizing loads.

Furthermore, a ring gear inner-part protrudes toward a sun gear further than does a ring gear outer-part, and a predetermined portion of the ring gear inner-part is inserted into the sun gear. Hence, when braking, a ring gear may be prevented from being removed from the sun gear.

In addition, since a carrier unit is splined to a piston unit, driving force may be transmitted to the piston unit by rotation of the carrier unit.

While the present invention has been described with respect to the specific embodiments illustrated in the attached drawings, these are only for illustrative purposes, and it will be apparent to those skilled in the art that various changes and modifications may be made without departing from the spirit and scope of the invention as defined in the following claims. Therefore, the spirit and scope of the present invention must be defined by the accompanying claims.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A brake apparatus for a vehicle, comprising:
    a pair of pressurization units configured to receive driving force from a drive unit and pressurize a brake pad, the pair of pressurization units comprising:
        a sun gear configured to be rotated by the driving force transmitted from the drive unit;
        one or more planetary gears configured to rotate while engaging with the sun gear; and
    a load transmitting unit installed between the pair of pressurization units and coupled to the pair of pressurization units, the load transmitting unit being configured to transmit a pressurizing load of any one of the pair of pressurization units to another one of the pair of pressurization units,
    wherein the load transmitting unit comprises a pair of ring gears, each of the pair of ring gears is configured to rotate while engaging with the one or more planetary gears, and the pair of ring gears are configured to be directly or indirectly engaged with each other.

2. The brake apparatus according to claim 1, wherein each of the pair of pressurization units further comprises:
    a carrier unit coupled to the one or more planetary gears; and
    a piston unit coupled with the carrier unit and configured to receive rotating force from the one or more planetary gears to pressurize the brake pad.

3. The brake apparatus according to claim 1, wherein one of the pair of pressurization units is configured to compensate for the other.

4. The brake apparatus according to claim 1, wherein the load transmitting unit further comprises one or more transmission gear units disposed between the pair of ring gears and configured to be engaged with the ring gears.

5. The brake apparatus according to claim 4, wherein the transmission gear units comprises at least one of a spur gear unit, a bevel gear unit, and helical gear unit.

6. The brake apparatus according to claim 4, wherein each of the pair of ring gears comprises:
a ring gear inner-part comprises internal gear teeth formed along an inner circumferential surface of the ring gear inner-part, the internal gear teeth is configured to be engaged with the one or more planetary gears; and
a ring gear outer-part coupled with an outer surface of the ring gear inner-part and comprises external gear teeth formed along an outer circumferential surface of the ring gear outer-part, the external gear teeth is configured to be engaged with the one or more transmission gear units.

7. The brake apparatus according to claim 6, wherein the ring gear inner-part and the ring gear outer-part are formed integrally with each other.

8. The brake apparatus according to claim 6, wherein the ring gear inner-part protrudes toward the sun gear further than the ring gear outer-part protrudes toward the sun gear, and the ring gear inner-part is inserted into the sun gear.

9. The brake apparatus according to claim 2, wherein the carrier unit is configured to be splined to the piston unit.

10. The brake apparatus according to claim 9, wherein the piston unit is configured to receive the rotating force from the carrier unit and linearly reciprocates in a direction toward the brake pad.

11. The brake apparatus according to claim 2, wherein the sun gear comprises:
a sun gear carrier comprises first gear teeth formed along an outer circumferential surface of the sun gear carrier, the first gear teeth engaging with the drive unit; and
a sun gear body comprises second gear teeth formed along an outer circumferential surface of the sun gear body such that the second gear teeth is configured to be engaged with the one or more planetary gears, the sun gear body being coupled to the sun gear carrier and configured to be concentric with a rotating center of the sun gear carrier.

12. The brake apparatus according to claim 11, wherein the sun gear carrier and the sun gear body are formed integrally with each other.

13. The brake apparatus according to claim 2, wherein the drive unit comprises:
a driving main body; and
a driving force transmitting gear unit configured to transmit driving force from the driving main body to the sun gear.

14. The brake apparatus according to claim 13, wherein the drive unit further comprises a driving worm shaft connecting two ends of the driving force transmitting gear unit.

15. A brake apparatus for a vehicle, comprising:
a pair of pressurization units configured to receive driving force from a drive unit and pressurize a brake pad, wherein each of the pair of pressurization units comprises:
a sun gear configured to be rotated by the driving force transmitted from the drive unit;
one or more planetary gears configured to rotate while engaging with the sun gear;
a carrier unit coupled to the one or more planetary gears;
a piston unit coupled with the carrier unit and configured to receive rotating force from the one or more planetary gears to pressurize the brake pad,
wherein the carrier unit is configured to be splined to the piston unit; and
a load transmitting unit installed between the pair of pressurization units and coupled to the pair of pressurization units, the load transmitting unit being configured to transmit a pressurizing load of any one of the pair of pressurization units to another one of the pair of pressurization units.

16. The brake apparatus according to claim 15, wherein the carrier unit includes one or more rotating shafts protruding therefrom, corresponding to the one or more planetary gears.

17. The brake apparatus according to claim 15, wherein the load transmitting unit comprises a pair of ring gears, each of the pair of ring gears is configured to rotate while engaging with the one or more planetary gears, and the pair of ring gears are configured to be directly or indirectly engaged with each other.

18. The brake apparatus according to claim 17, wherein the load transmitting unit further comprises one or more transmission gear units disposed between the pair of ring gears and configured to be engaged with the ring gears.

19. The brake apparatus according to claim 18, wherein the transmission gear units comprises at least one of a spur gear unit, a bevel gear unit, and helical gear unit.

20. The brake apparatus according to claim 18, wherein each of the pair of ring gears comprises:
a ring gear inner-part comprises internal gear teeth formed along an inner circumferential surface of the ring gear inner-part, the internal gear teeth is configured to be engaged with the one or more planetary gears; and
a ring gear outer-part coupled with an outer surface of the ring gear inner-part and comprises external gear teeth formed along an outer circumferential surface of the ring gear outer-part, the external gear teeth is configured to be engaged with the one or more transmission gear units.

* * * * *